(12) United States Patent
Niimi

(10) Patent No.: US 7,660,574 B2
(45) Date of Patent: Feb. 9, 2010

(54) CELLULAR TELEPHONE DEVICE HAVING A NON-CONTACT TYPE INTEGRATED CIRCUIT CARD PROCESSING SECTION

(75) Inventor: Tomohiro Niimi, Tachikawa (JP)

(73) Assignee: Casio Hitachi Mobile Co., Ltd., Tokyo (JP)

( * ) Notice: Subject to any disclaimer, the term of this patent is extended or adjusted under 35 U.S.C. 154(b) by 636 days.

(21) Appl. No.: 11/222,274

(22) Filed: Sep. 8, 2005

(65) Prior Publication Data

US 2006/0079282 A1    Apr. 13, 2006

(30) Foreign Application Priority Data

Sep. 22, 2004    (JP) .............................. 2004-274349

(51) Int. Cl.
    *H04M 11/00*    (2006.01)
(52) U.S. Cl. ...................... 455/407; 455/405; 455/406; 455/408; 455/41.2; 455/556.1; 455/558; 455/566; 455/567; 379/114.1; 379/114.15; 379/114.16; 379/114.17; 379/114.19; 379/114.2; 705/39; 705/41
(58) Field of Classification Search ......... 455/405–409, 455/414.1–4, 566–567, 41.1–41.3, 556.1, 455/557, 558; 379/114.1–114.29; 705/39–43
    See application file for complete search history.

(56) References Cited

U.S. PATENT DOCUMENTS

| 7,215,942 B1 * | 5/2007 | McQuaide et al. .......... 455/408 |
| 7,242,922 B2 * | 7/2007 | Fieldhouse et al. .......... 455/406 |

FOREIGN PATENT DOCUMENTS

| JP | 08-263612 | 10/1996 |
| JP | 08-287169 | 11/1996 |
| JP | 2000-099609 | 4/2000 |
| JP | 2004-030271 | 1/2004 |
| JP | 2004-062265 | 2/2004 |
| WO | WO 03/091924 | * 11/2003 |

OTHER PUBLICATIONS

Japanese Office Action (with an English translation) issued in the corresponding foreign application No. 2004-274349.

* cited by examiner

*Primary Examiner*—Tuan A Tran
(74) *Attorney, Agent, or Firm*—Cohen Pontani Lieberman & Pavane LLP

(57) ABSTRACT

When a card remaining balance for a non-contact type integrated circuit card processing chip 114 has been updated, a CPU 101 indicates that the card remaining balance has been updated by performing drive control of a notification portion (information LED 8, information speaker 9) having a cellular telephone function.

14 Claims, 5 Drawing Sheets

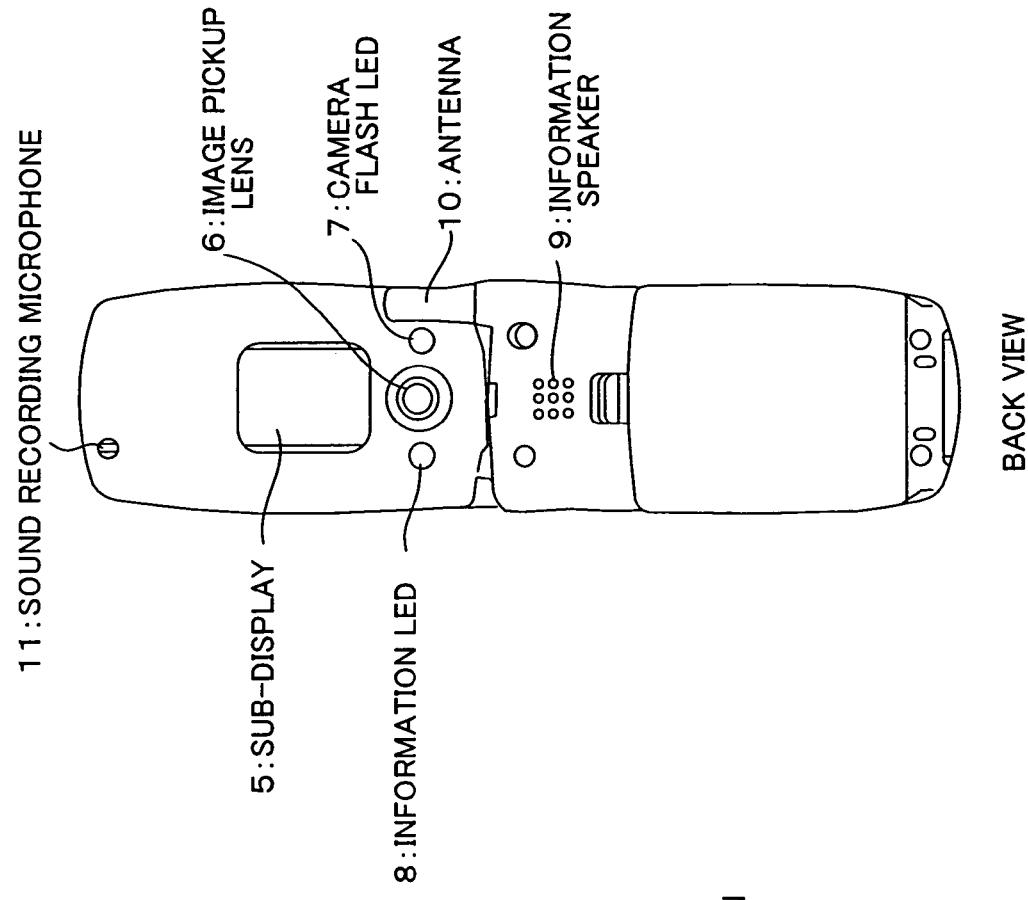
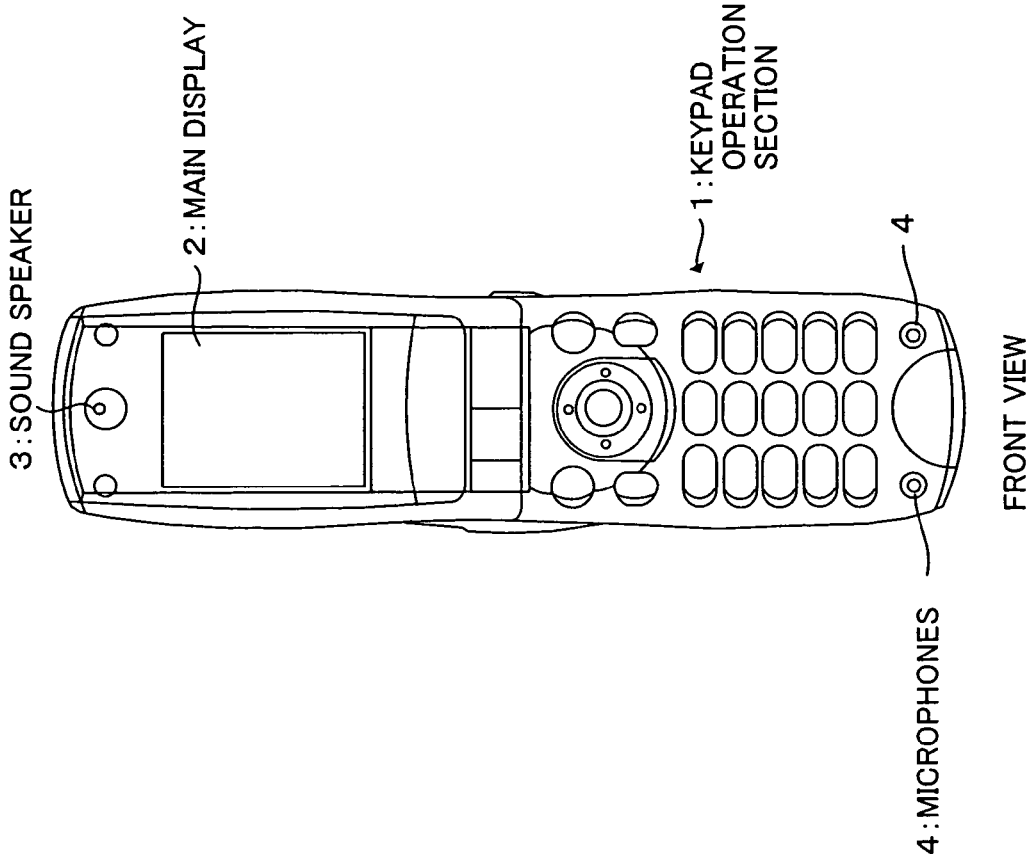

IC CARD SIDE MEMORY CONTENTS

CELLULAR MAIN BODY SIDE MEMORY CONTENTS

CELLULAR TELEPHONE DEVICE HAVING A NON-CONTACT TYPE INTEGRATED CIRCUIT CARD PROCESSING SECTION

CROSS-REFERENCE TO RELATED APPLICATION

This application is based upon and claims the benefit of priority from the prior Japanese Patent Application No. 2004-274349, filed Sep. 22, 2004, the entire contents of which is incorporated herein by reference.

BACKGROUND OF THE INVENTION

1. Field of the Invention

The present invention relates to a cellular telephone device and a program documentation medium having a non-contact type integrated circuit card processing section.

2. Description of the Related Art

Conventionally, an electronic wallet balance display system is known which displays in symbols the remaining balance of an electronic wallet stored inside an Integrated Circuit (IC) card, for instance, card type electronic money that serves as an alternative to ready cash and credit cards (for example, Japanese Laid-Open (Kokai) Patent Application No. H08-287169 (1996) titled "ELECTRONIC PURSE BALANCE DISPLAY SYSTEM"). Additionally, when the electronic money in a non-contact type IC card is updated (reduced), a payment data notification service server provides notification by E-mail to the cardholder (the person to whom a personal card was issued; hereinafter, referred to as the "user") of the cellular telephone that the remaining balance has been decreased via the server (for example, Japanese Laid-Open (Kokai) Patent Application No. 2004-030271 titled "SETTLEMENT INFORMATION REPORTING SERVICE SERVER AND METHOD FOR REPORTING SETTLEMENT INFORMATION").

However, in regard to the conventional prior art mentioned above in JP H08-287169 (1996), even though the card remaining balance is displayed as symbols in response to a Personal Identification Number (PIN) input operation and the card is identifiable anywhere at anytime without a third party learning the card remaining balance, this system requires the user's interaction. Furthermore, in regard to the conventional prior art mentioned above in JP 2004-030271, in order to provide E-mail notification to the user of the cellular telephone, there are remaining matters, such as the necessity of a server, communication costs, etc. This is beside the fact that notification is limited to cases when the card remaining balance decreases.

Apart from that, in recent years with the technological progress in cellular telephone devices and non-contact type IC cards, for example, cellular telephone devices which can be practically used as a commuter pass are available. Also, cellular telephone devices which can be practically used as a prepaid card, etc. are starting to become more widely accessible.

When this kind of cellular telephone is used for entry< >exit management, such as a commuter pass, etc., communication with a card reader which is external equipment can be performed normally. Since the entry< >exit place allows admittance, the user does not have to confirm the existence of communication, etc. Also, when using this kind of cellular telephone as an alternative to a prepaid card, the existence of communication, etc. can be checked from that particular location and used with a level of ease and comfort. Specifically, at the time of a transaction, the user can determine whether or not there was an accurate transaction and the exact amount of payment, be aware of the latest card remaining balance, etc. and know various other data. Thus, the cellular telephone can be used without anxiety. In that respect, when confirming the amount paid, etc. on the display for indication to the user from an accounting terminal side, there is the possibility of misunderstanding the displayed data, for example, the amount deposited, sub-total, etc. and also non-preferred display of the card remaining balance by an accounting terminal side with regard to personal privacy, etc.

SUMMARY OF THE INVENTION

The subject of the first invention is a cellular telephone device having a non-contact type IC card processing section which provides notifications to the cardholder whenever numeric value data indicating a monetary value has been updated. Also, these notifications can be accomplished using the existing cellular telephone function.

The subject of the second invention is a cellular telephone device having a non-contact type IC card processing section which provides notifications to the cardholder whenever numeric value data indicating a monetary value has been updated and at the same time being able to recognize the approximate remaining amount of the latest numeric value data after an update. Also, these notifications can be accomplished using the existing cellular telephone function.

The first invention is characterized as a cellular telephone device having a non-contact type integrated circuit card processing section which performs wireless communication with a card processing device as external equipment, comprising a discrimination means for discriminating whether or not numeric value data indicating a monetary value stored in the non-contact type IC card processing section has been updated by wireless communication with the card processing device; and a notification control means for performing drive control of a notification portion having a cellular telephone function to indicate the numeric value data has been updated whenever the discrimination means discriminates that the numeric value data has been updated.

The second invention is characterized by a cellular telephone device having a non-contact type integrated circuit card processing section which performs wireless communication with a card processing device as external equipment, comprising an acquisition means for acquiring latest numeric value data after an update, whenever numeric value data indicating a monetary value stored in the non-contact type integrated circuit card processing section has been updated by wireless communication with the card processing device; and a notification control means for performing drive control of a notification portion having a cellular telephone function depending upon the latest numeric value data after the update has been acquired by the acquisition means.

According to the first invention, a notification to indicate the numeric value data has been updated performs drive control of a notification portion having a cellular telephone function whenever the numeric value data stored in the non-contact type IC card processing section has been updated. For example, in case where the cellular telephone device with a non-contact type IC card function is used as an alternative to a prepaid card, transactions can be immediately verified on the spot while in the cardholder's hand and a sense of security can be provided to the user. In this case, notification can be accomplished whenever the contents of the card are updated even when not carrying out a particular operation. Thus, it is not necessary to provide special equipment, such as a server, as notification using the existing cellular telephone function is available. This directly results in increased convenience and practical applicability.

According to the second invention, a notification to indicate the numeric value data has been updated performs drive control of a notification portion having a cellular telephone function corresponding to the latest numeric data after an update whenever the numeric value data stored in the non-contact type IC card processing section has been updated. At the time of a transaction using this card, the present card remaining balance can be immediately confirmed on the spot while in the cardholder's hand. Thus, a sense of security can be provided to the user and effective with regard to personal privacy. Moreover, notifications using the existing cellular telephone function can be accomplished, which increases convenience of use and practical applicability.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 1A and 1B are outline views of a cellular telephone device. FIG. 1A is a front view of the main body for a foldable type device in an opened position. FIG. 1B is the back view in this opened position;

DETAILED DESCRIPTION OF THE PREFERRED EMBODIMENTS

Figure 2:
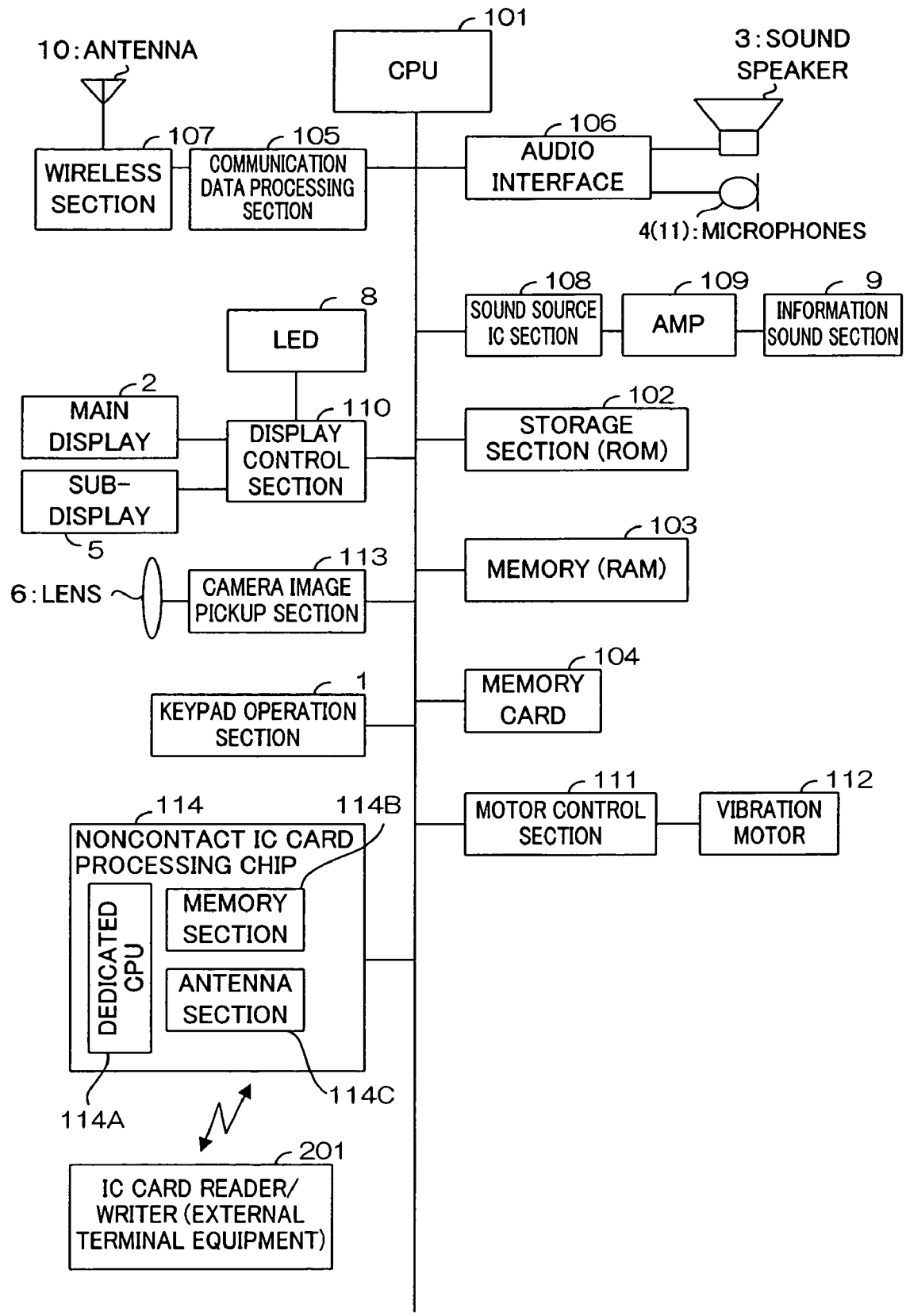
FIG. 2 is a block diagram showing the basic constituent elements of the cellular telephone device.

Hereinafter, the first embodiment of the present invention will be explained with reference to FIG. 1 thru FIG. 4.

FIGS. 1A and 1B are outline views of a cellular telephone device. FIG. 1A is a front view of the main body for a foldable type device in an opened position. FIG. 1B is the back view in this opened position.

This cellular telephone device includes a camera photography function, an Internet function, a sound recording function, etc. as optional functions other than a telephone call and E-mail functions. As shown in FIG. 1A, in addition to a keypad operation section 1 and a main display 2 which has a telephone call function, a sound speaker 3 and microphones 4 are provided.

Additionally, as seen in FIG. 1B, the back side of the cellular telephone is provided with a sub-display 5, an image pickup lens 6 which has a camera photography function, a camera flash LED 7, an information LED 8, an information speaker 9, an antenna 10 and a microphone 11 (sound recording microphone) which has a sound recording function. The keypad operation section 1 is for performing dial input, character input and command input. The main display 2, for example, is a 2.4 inch color liquid crystal screen containing a high resolution display that shows an image size of 2640× 1200 dots. The sub-display 5 is a screen on the back side for advisory display, such as the current time, E-mail messages, etc. in the folded position of a foldable type device main body.

FIG. 2 is a block diagram showing the basic constituent elements of the cellular telephone device.

A CPU 101 is a central processing unit which controls the overall operation of this cellular telephone device corresponding to various programs in a storage section 102. The storage section 102 is nonvolatile memory (internal memory), for example, containing a ROM (flash memory, etc) having a program area and a data area. The program for implementing the embodiment corresponding to the operating procedures shown in FIG. 4 (described later) is stored in this program area. A memory 103 (for example, RAM) is an internal memory which has a work area. Also, a memory card 104 is a recording medium which can be freely attached and detached, for example, containing a Smart Media, IC card, etc., and used to perform transfers of image data between the RAM 103.

A communication data processing section 105 and an audio interface 106 are connected to the CPU 101. When a wireless section 107 detects reception of electromagnetic waves (also called radio waves) from the antenna 10, digital conversion is performed and the communication data processing section 105 is supplied. The communication data processing section 105 distinguishes telephone calls, E-mail reception and Internet reception. Whenever a telephone call or an E-mail is received, the CPU 101 reads the ring tone set in a sound source IC section 108 which is provided to an amplifier (AMP) 109. This generates output of the ring tone from the information sound section 9 (equivalent to the information speaker 9) and blinking drive is supplied to the information LED 8 via a display control section 110. In this case, when set to "manner mode" which precludes generation of the ring tone, a vibration motor 112 is driven via a motor control section 111.

Besides, the CPU 101 is connected to the main display 2, the sub-display 5 and the information LED 8 via the display control section 110. Also, the CPU 101 is connected to the keypad operation section 1 which is the input/output peripheral device. Furthermore, the CPU 101 is connected to a camera image pickup section 113 and a non-contact type IC card processing chip 114 (also commonly referred to as contactless). The camera image pickup section 113 comprises a ranging sensor, a light amount sensor, an analog processing circuit, a signal processing circuit, a compression/expansion circuit, etc., in addition to a lens•mirror block, such as an image pickup lens, mirror, etc., an image pickup device, such as a CCD image sensor and the related drive system. Furthermore, the camera image pickup section 113 performs adjustment control of the optical zoom, drive control when autofocusing, shutter drive control and controls exposure, white balance, etc.

Figure 3:
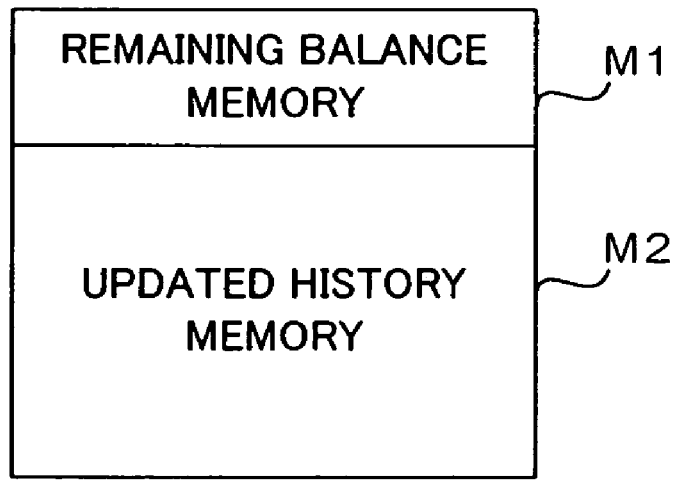
FIG. 3 is a diagram showing the remaining balance memory M1 formed in the memory section 114B of a non-contact type IC card processing chip 114 and updated history memory M2.

The non-contact type IC card processing chip 114 comprises the basic functions carried in a non-contact type IC card although the overall shape is optional and a prepaid amount of money (for example, 10,000 yen or 5,000 yen) is stored in the card. The non-contact type IC card processing chip 114 has a dedicated CPU 114A (for IC card exclusive use), a memory section 114B and an antenna section 114C. Short distance communication is performed by weak electromagnetic waves with a card processing device (IC card reader/writer) 201 as external equipment. The memory section 114B is constituted, for example, with flash memory and, as shown in FIG. 3, has a remaining balance memory M1 and an updated history memory M2. In addition, the antenna section 114C transmits and receives electromagnetic waves. Even though the electromotive force induced by receiving electromagnetic waves from the IC card reader/writer 201 may be used as the non-contact type IC card operating power (energizing power), it is also possible to acquire the non-contact type IC card operating power from the power supply section of the cellular telephone side.

When reception of electromagnetic waves from the IC card reader/writer 201 is detected, the non-contact type IC card processing chip 114 will read the card remaining balance from the remaining balance memory M1 and a transmission output will be carried out from the antenna section 114C. In this case, the IC card reader/writer 201, for example, connects to an accounting terminal (not shown). When this transaction amount (amount of money to be billed) is deducted from the received card balance acquired from the non-contact type IC card processing chip 114, an update of the card remaining balance is performed. Then, a transmission output of the latest card remaining balance after this update is accomplished which contains data, such as the user's name, transaction date, transaction amount (updated amount of money), etc. from that antenna (not shown).

Here, the non-contact type IC card processing chip 114 receives the acquired latest card remaining balance after this update containing data, such as the user's name, transaction data, transaction amount (updated amount of money) from the IC card reader/writer 201. Concurrently, the latest card remaining balance after this update is written in the remaining balance memory M1 and a reduction update (expenditure update) of those contents is performed. Besides, the data which includes a user's name, transaction data, updated amount of money (amount paid for the most recent transaction), etc. is written in the updated history memory M2 as history data regarding that particular transaction. In this case, the cellular telephone side of the CPU 101 monitors when the non-contact type IC card processing chip 114 has been accessed and the contents of the remaining balance memory M1 are updated. But when the contents of the remaining balance memory M1 are updated, it is also possible for the non-contact type IC card processing chip 114 to provide instructions for updating to the CPU 101 cellular telephone side. Furthermore, as mentioned above, the CPU 114A for IC card exclusive use is provided in the non-contact type IC card processing chip 114 side, but it is also possible for the CPU 101 cellular telephone side to control that operation instead of the CPU 114A for IC card exclusive use.

The CPU 101 cellular telephone side monitors whether or not the non-contact type IC card processing chip 114 has been accessed and the contents of the remaining balance memory M1 are updated. When an update of the card remaining balance has been carried out, the updated amount of money (amount paid for the most recent transaction) is read from the updated history memory M2 in the non-contact type IC processing chip 114 and also provides an indication by generating an alarm sound from the information speaker 9 together with blinking drive supplied to the information LED 8. Further, the vibration motor 112 is driven via the motor control section 111 corresponding to this updated amount of money and made to perform variable control of the vibration intensity and time duration time.

Figure 4:
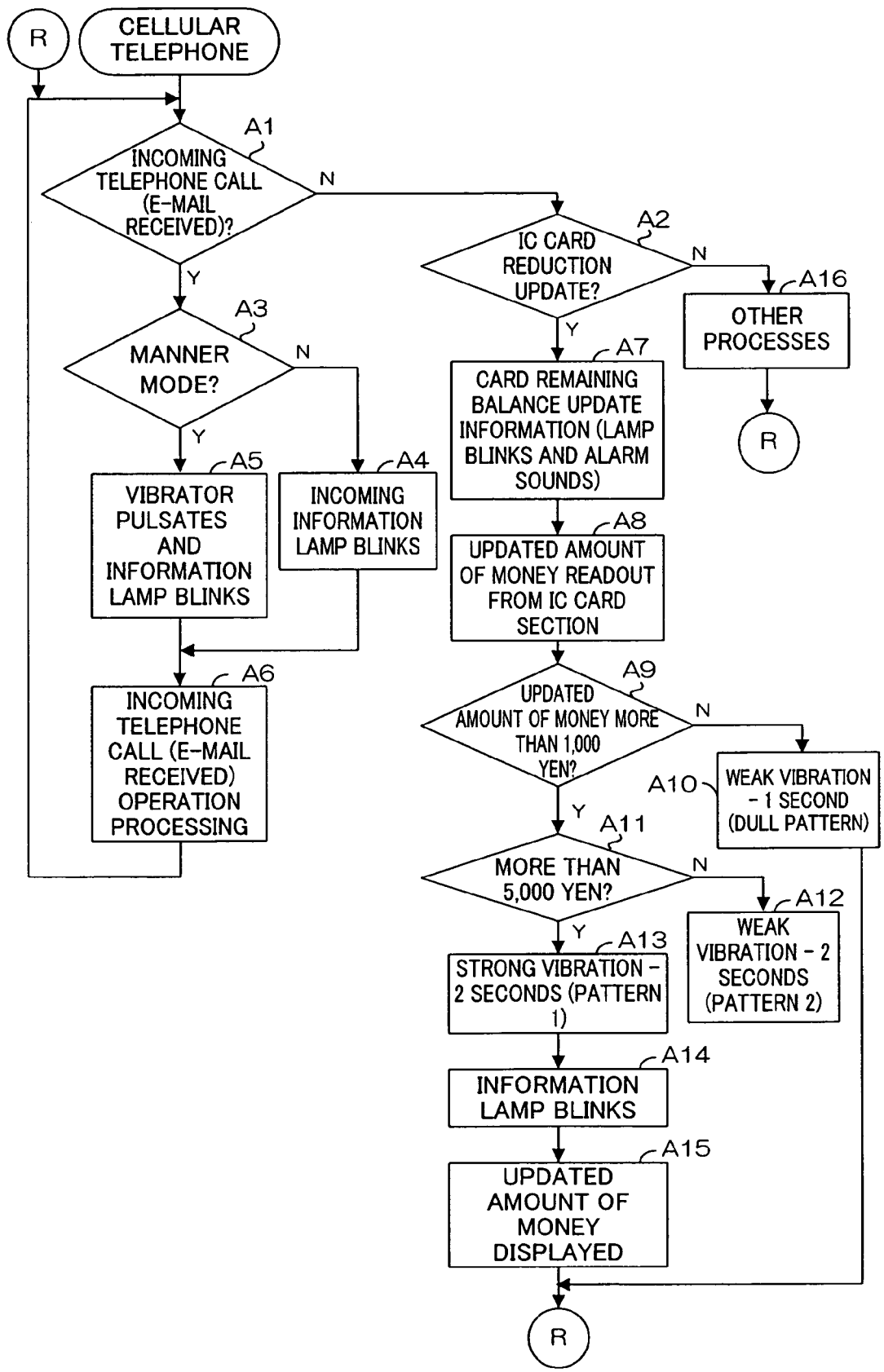
FIG. 4 is a flow chart showing the overall operation of the cellular telephone device which is executed at start-up following power supply activation.

Hereinafter, the operational concept of the cellular telephone device in this first embodiment will be explained with reference to the flow chart as seen in FIG. 4. Here, each function described in the flow chart is stored in the form of program code which can be read and operation according to this program code is successively executed. Also, operation according to the above-mentioned program code transmitted via a transmission media can also be successively executed. This is also the same in other embodiments described later. Besides a recording medium, operation distinctive to this embodiment example can also be executed using a program/data externally supplied via transmission media.

FIG. 4 is a flow chart showing the overall operation of the cellular telephone device which is executed at start-up following power supply activation.

Initially, following power "ON" which constitutes an idle mode, the CPU 1 reads out a previously set decorative wallpaper image and executes output display to the main display 2. In an idle status when this default window is displayed, an incoming telephone call (E-mail received), existence of an IC card reduction update and existence of an input operation are checked (Steps A1, A2). At this stage, upon detection of an incoming telephone call or E-mail is received (Step A1="YES"), the operation examines whether or not the cellular telephone is set to "manner mode" (Step A3).

Here, if the cellular telephone is not set to the "manner mode," a ring tone outputs from the information speaker 9, blinking drive is supplied to the information LED 8 and incoming message arrival notification is performed (Step A4). Conversely, when the cellular telephone is set to the "manner mode," drive for output of the vibration motor 112 is provided instead of a ring tone and vibration is generated, blinking drive is supplied to the information LED 8 and incoming message arrival notification is performed (Step A5). Then, incoming telephone call (E-mail received) operation processing is performed (Step A6). In this case, when there is an incoming telephone call corresponding to an on-hook operation (answering operation) which constitutes a telephone call condition, incoming telephone call operation processing continues until an off-hook operation (termination operation) is performed to disconnect the telephone call. Also, when E-mail is received, after storing the received E-mail in a mailbox, the received E-mail is displayed on the main display 2 corresponding to an E-mail opening operation. Then, the operation reverts to Step A1 which constitutes an idle status.

Meanwhile, the CPU 101 monitors whether or not a reduction update of the card remaining balance has been performed corresponding to instructions with an update of the card remaining balance from the non-contact type IC card processing chip 114 (Step A2). When a card remaining balance reduction update is performed, the operation informs the user by generating output of an alarm sound from the information speaker 9 together with blinking drive supplied to the information LED 8 (Step A7). In this case, although the operation informs the user the card remaining balance has been updated by intermittent sound twice (alarm sound) and the lamp blinks for one second, this notification style is optional and these notification details can be set to the user's preference. The notification accompanying an update such as the card remaining balance is performed in a different style than the notification style used as a cellular telephone function. Next, the updated amount of money (amount paid for the most recent transaction) is acquired from the updated history memory M2 in the non-contact type IC card processing chip 114 (Step A8). The operation shifts to processing which performs variable control of the vibration intensity and time duration corresponding to the updated amount of money and drives the vibration motor 112 via the motor control section 111.

Specifically, the operation checks whether or not the updated amount of money is more than a predetermined amount of money (for example, 1,000 yen) (Step A9). In a case of less than 1,000 yen, namely, the amount paid by the user is not as much, a motor drive command which makes the vibration intensity "weak" and time duration "one second" is provided to the motor control section 111 which drives the vibration motor 112 (Step A10). Also, such a vibration pattern is termed as a "dull pattern." Moreover, when the updated amount of money is more than 1,000 yen (Step A9="YES"), the operation further checks whether or not the updated amount of money is more than a predetermined amount of money (for example, 5,000 yen) (Step A11). Here, the above-mentioned amount of money "1,000 yen" and "5,000 yen" is numeric value data optionally inputted and set in advance by the user. These preset values can be rewritten on an as needed basis. For instance, notifications enabled according to the user's preference, such as the user desires notification when the amount paid is more than 1,000 yen and the user desires notification when the amount paid is more than 10,000 yen.

Here, when less than 5,000 yen but more than 1,000 yen, namely, the amount paid by the user is a certain amount (Step A11="NO"), a motor drive command which makes the vibration intensity "weak" and time duration "two seconds" is provided to the motor control section 111 which drives the vibration motor 112 (Step A12). Also, such a vibration pattern is termed as "pattern (2)." Moreover, when the updated amount of money is more than 5,000 yen (Step A11="YES") and the amount paid is a large sum for the user, a motor drive command which makes the vibration intensity "strong" and time duration "two seconds" is provided to the motor control section 111 which drives the vibration motor 112 (Step A13). Also, such a vibration pattern is termed as "pattern (1)."

Next, when the updated amount of money is more than 1,000 yen (Step A9="YES"), the operation supplies blinking drive to the information LED 8 besides the vibration notification mentioned above (Step A14). Also, in this case, although the information LED 8 continues rapid blinking for two seconds, this may also be a notification provided according to an alarm sound. Here, in order to clearly distinguish between a notification upon an update of the card remaining balance and a notification corresponding to an updated amount of money, these can be carried out, for instance, at the time of an update of the card remaining balance by an alarm sound notification and at the time of information corresponding to an updated amount of money by a lamp blinking notification. Furthermore, at the time of an update of the card remaining balance, for example, the alarm sound and the lamp blinking can be performed simultaneously; and at the time of notification corresponding to an updated amount of money, the notification time duration of only by lamp blinking can be further extended.

In this manner, after carrying out notification corresponding to an updated amount of money, the operation advances to Step A15. Then, after performing an advisory display of this updated amount of money to the sub-display 5, the operation reverts to Step A1. In this idle status, when some kind of input operation occurs (Step A2="NO"), for example, when there is a keystroke operation relating to camera photography recording/processing, E-mail transmission processing, Internet access/receiving processing and other processing performed, processing corresponding to an operation key is carried out (Step A16). Then, the operation will revert to Step A1 and again revert to an idle status.

As described above, upon notification that the card remaining balance has been updated, the CPU 101 of this first embodiment performs drive control of the notification portion (information LED 8, information speaker 9) having a cellular telephone function when the card remaining balance of the non-contact type IC card processing chip 114 is updated. For example, in cases where the cellular telephone device with a non-contact type IC card function is used as an alternative to a prepaid card, transactions can be immediately verified on the spot while in the cardholder's hand and a sense of security can be provided to the user. In this case, notification can be accomplished whenever the contents of the card are updated even when not carrying out a particular operation. Thus, it is not necessary to provide special equipment, such as a server, as notification using the existing cellular telephone function is available. This directly results in increased convenience and practical applicability.

In this case, as the notification associated with the cellular telephone function is made to perform drive control of the notification portion (information LED 8, information speaker 9) in a different style than the notification style used as a cellular telephone function, it is possible to readily identify notifications accompanying updates of the card remaining balance.

Additionally, upon updates of the card remaining balance, an advisory display shows the updated amount of money in the sub-display 5. Also, for example, as an alternative to a display for indication to the user from an accounting terminal side, the updated amount of money, for example, an amount paid, a fare, a charge for service, etc. can be readily confirmed on the spot while in the cardholder's hand.

Further, as the CPU 101 acquires the updated amount of money which updates the card remaining balance from the non-contact type IC card processing chip 114, the operation performs variable control of the vibration intensity and notification time duration corresponding to this updated amount of money. Thus, for example, even if the cellular telephone is not configured to confirm an amount paid, etc. by numeric value display, the approximate amount can be recognized by the vibration intensity and time duration. Accordingly, the user can recognize that when the vibration is a "dull pattern," the updated amount is less than 1,000 yen; when "pattern 2," the updated amount of money is less than 5,000 yen but more than 1,000 yen; and when "pattern 1," the updated amount of money is more than 5,000 yen.

Moreover, the operation performs an assignment modification of a number of notification portion styles (information LED 8, information speaker 9) composed of a plural variety of drive objects from among the notification portion having a cellular telephone function. For example, when not confirming an updated amount of money (amount paid) by a numeric value display, the approximate amount can be recognized by whichever notification portion style has been driven. In this case, a number of the notification portion parts are used as drive objects and are altered corresponding to the updated amount of money. Thus, the approximate amount can be understood by a combination of vibration and an alarm sound, a combination of a blinking lamp and an alarm sound, etc.

Furthermore, in the first embodiment mentioned above, although the updated amount of money for performing a reduction update (expenditure update) of the card remaining balance is acquired from the non-contact type IC card processing chip 114, the card remaining balance before an update is readout and stored temporarily from the non-contact type IC card processing chip 114. Then, when an update of the card remaining balance is carried out, the latest card remaining balance after an update is read from the non-contact type IC card processing chip 114. Subsequently, the CPU 101 side acquires and calculates the transaction updated amount of money by subtracting the card remaining balance after an update from the card remaining balance before an update.

Also, in the first embodiment mentioned above, the operation can perform an advisory display of the updated amount of money to the sub-display 5. Besides, in the case of a foldable type cellular telephone main body in an opened position, the advisory display of the updated amount of money can be executed to the main display 2.

Also, in the first embodiment mentioned above, notification that the card remaining balance has been updated is performed. Besides, when the non-contact type IC card is used as a credit card, for example, it is possible for notification to be provided when this type of transaction amount is stored and the contents of the card are updated.

On the other hand, it is also possible to provide a recording medium (for example, CD-ROM, a flexible disk, a RAM card, etc.) which respectively stores the program code for executing each means mentioned above to a processor. Specifically, a recording medium containing program code which can be read by a processor. In this manner, it is possible to provide a recording medium which can store programs for implementing a function for discriminating whether or not numeric value data indicating a monetary value stored in a non-contact type IC card processing section has been updated by wireless communication with a card processing device which is external equipment; and a function for performing drive control of a notification portion having a cellular telephone function to indicate the numeric value data has been updated whenever discriminated the numeric value data has been updated.

Second Embodiment

Hereinafter, the second embodiment of the present invention will be explained with reference to FIG. 5 and FIG. 6.

Furthermore, the first embodiment mentioned above relates to notifications that the card remaining balance has been updated and the approximate amount of the updated amount of money. This second embodiment relates to notifications of the approximate amount of the latest card remaining balance after an update besides the update notification of the card remaining balance.

Here, with respect to any equivalent fundamentals or denominations in both embodiments, the same nomenclature is appended and further explanation has been omitted. Hereinafter, explanation will be focused on the characterizing portion of the second embodiment.

Figure 5:
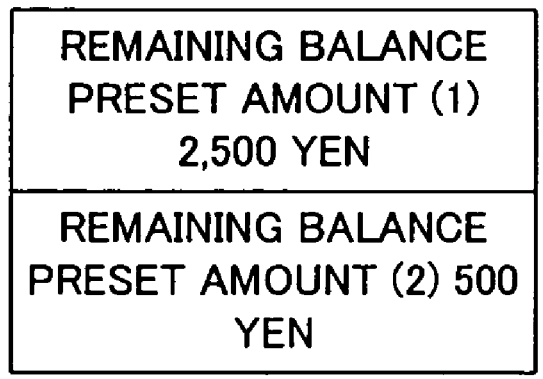
FIG. 5 is a diagram for explaining the remaining balance preset amount preset amount which is optionally set in the memory 103 side of the cellular telephone.

FIG. 5 is a diagram for explaining the remaining balance preset amount preset amount which is optionally set in the memory 103 side of the cellular telephone.

In the non-contact type IC card processing chip 114 in which 10,000 yen or 5,000 yen is stored as a prepaid amount of money, this remaining balance preset amount, for example, is applied when judging how much the card remaining balance has decreased. Also, storage and file management is performed in two categories of the remaining balance preset amount referenced as (1) and (2). Here, the remaining balance preset amount (1) is 2,500 yen and the remaining balance preset amount (2) is "500 yen." By comparing this preset amount with the present card remaining balance, the card remaining balance judges, for example, more than 2,500 yen, less than 2,500 yen but more than 500 yen and less than 500 yen. Here, the above-mentioned remaining balance preset amounts of "2,500 yen" and "500 yen" represent numeric value data optionally inputted and preset in advance by the user. These preset values can be rewritten on an as needed basis. For instance, the card remaining balance corresponds to notifications enabled according to the user's preference, such as the user desires notification when the amount paid is less than 1,000 yen and the user desires notification when the amount paid is less than 2,000 yen. In addition, when optionally setting the remaining balance which the user desires, it is possible to set one variety or more than three varieties.

Figure 6:
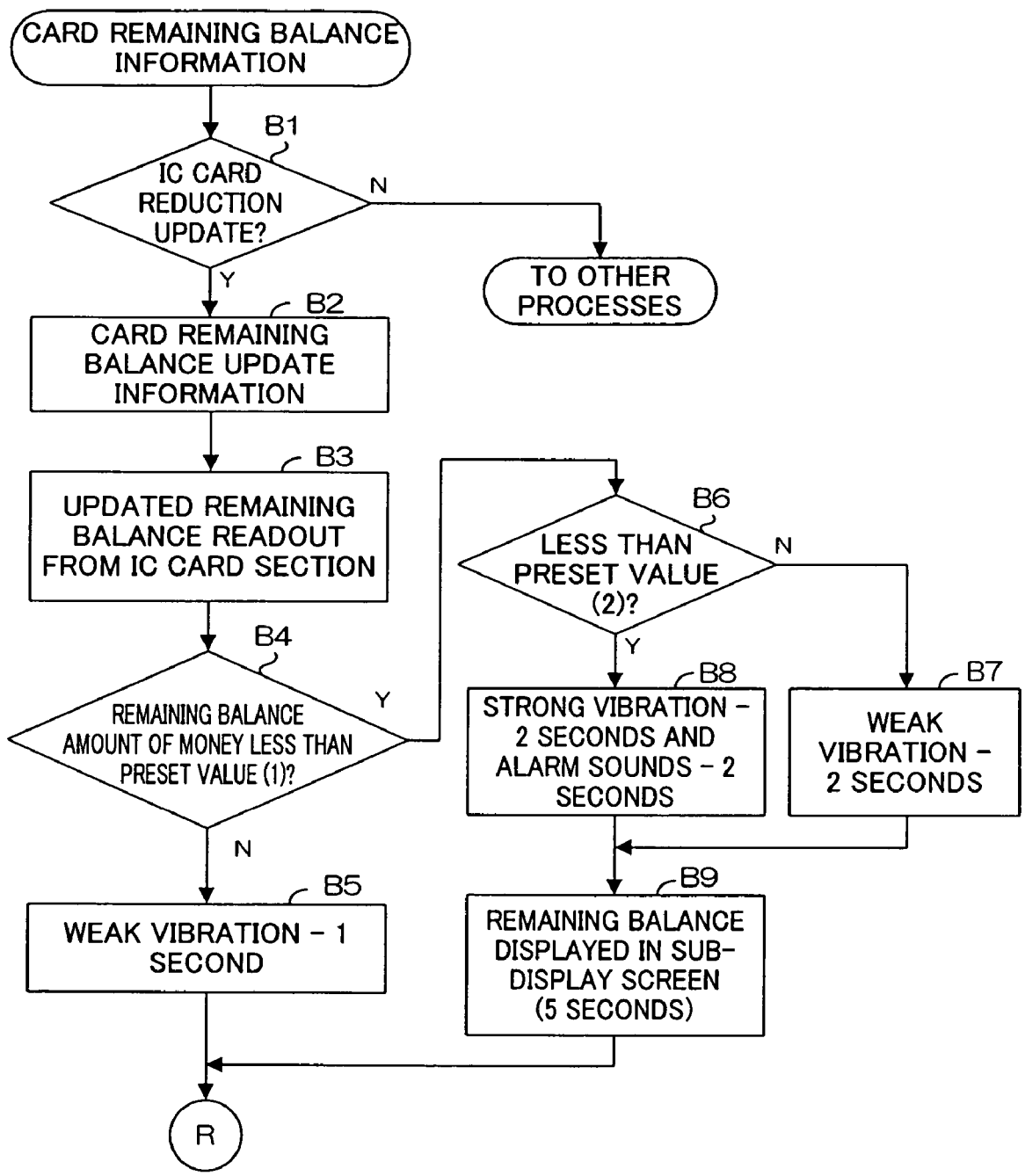
FIG. 6 is a flow chart showing the characterizing portion (information processing associated with the card remaining balance) in the second embodiment and illustrates information processing that replace Steps A2 and A7~A15 of FIG. 4.

FIG. 6 is a flow chart showing the characteristic portion (information processing associated with the card remaining balance) in the second embodiment and illustrates information processing that replaces Steps A2 and A7~A15 of FIG. 4. As all the remaining process steps are the same as that mentioned above in FIG. 4, further explanation has been omitted.

Initially, like the first embodiment mentioned above, the CPU 101 monitors whether or not a reduction update of the card remaining balance has been performed corresponding to instructions with an update of the card remaining balance from the non-contact type IC card processing chip 114 (Step B1). When a card remaining balance reduction update (expenditure update) is performed, the operation carries out a notification by generating output of an alarm sound from the information speaker 9 together with blinking drive supplied to the information LED 8 (Step B2). This case of notification is the same as the first embodiment example mentioned above. Then, the present card remaining balance is readout from the remaining balance memory M1 in the non-contact type IC card processing chip 114 (Step B3) and notification processing corresponding to this card remaining balance is carried out.

Specifically, the CPU 101 compares the card remaining balance with the remaining balance preset amount (1). The operation checks whether or not the card remaining balance is less than 2,500 yen (Step B4). When the card remaining balance exceeds the remaining balance preset amount (1) which indicates a sufficient remaining amount, the vibration motor 112 will be driven by a "dull pattern" (Step B5). In this case, the vibration intensity is "weak" with time duration of "one second." Besides, when less than the remaining balance preset amount (1) (Step B4="YES"), the CPU 101 compares the card remaining balance with the remaining balance preset amount (2). The operation checks whether or not the card remaining balance is less than 500 yen (Step B6). Here, when the card remaining balance exceeds the remaining balance preset amount (2), although less than 2,500 yen, the remaining balance is over 500 yen indicating a sufficient remaining amount (Step B6="NO"). The vibration motor 112 will be driven by a "pattern (2)" (Step B7). In this case, the vibration intensity is "weak" with time duration of "two seconds." Furthermore, when the card remaining balance decreases below the remaining balance preset amount (2) (Step B6="YES"), the vibration motor 112 will be driven by a "pattern (1)" and the information speaker 9 will be driven to generate output of an alarm sound performed for two seconds (Step B8). In this case, the vibration intensity is "strong" with time duration of "two seconds." Here, when the card remaining balance is less than the remaining balance preset amount (1), the operation will advance to Step B9 after a vibration notification and an advisory display of the card remaining balance will be executed to the sub-display 5. Then, the operation reverts to Step A1 of FIG. 4.

As mentioned above, in this second embodiment, whenever the card remaining balance in the non-contact type IC card processing chip 114 is updated, the operation performs drive control of the notification portion (vibration motor 112, information speaker 9) having a cellular telephone function corresponding to the latest card remaining balance after an update. At the time of a transaction using this card, the present card remaining balance can be immediately confirmed on the spot while in the cardholder's hand. Thus, a sense of security can be provided to the user and effective regarding personal privacy by preventing unwanted viewing of a sufficient card remaining balance. Moreover, notifications using the existing cellular telephone function can be accomplished, which increases convenience of use and practical applicability.

In this case, on the condition that the latest card remaining balance after an update is less than the remaining balance preset amount set in advance, the operation performs drive control of the notification portion (vibration motor 112, information speaker 9) having a cellular telephone function. For example, the user can easily recognize the balance has decreased to a certain limit based on vibration, an alarm sound, etc. Furthermore, the operation performs variable control of the vibration intensity and notification time duration corresponding to the card remaining balance. Thus, even if the user does not confirm the card remaining balance by a numeric value display (advisory display) the approximate remaining amount can be distinguished by way of the vibration intensity and time duration.

In the second embodiment described above, when the card remaining balance remains sufficient, namely, the operation carries out a notification operation also when exceeding the remaining balance preset amount (1), this can be limited to performing a notification when the card remaining balance decreases.

Also, in the second embodiment described above, although the user can optionally enable two categories of remaining balance preset amounts, the cellular telephone may be set to carry out a notification operation, for example, by 1,000 yen units, 100 yen units, etc. when the card remaining balance decreases. Furthermore, in the second embodiment described above, although the operation performs advisory display of the card remaining balance to the sub-display, in the case of a foldable type cellular telephone main body in an opened position, the advisory display of the card remaining balance can be executed to the main display 2.

Also, it is also possible to provide a recording medium (for example, CD-ROM, a flexible disk, a RAM card, etc.) which respectively stores the program code for executing each means mentioned above to a processor. Specifically, a recording medium containing program code which can be read by a processor for implementing a function for acquiring latest numeric value data after an update whenever numeric value data indicating a monetary value stored in a non-contact type integrated circuit card processing section has been updated by wireless communication with a card processing device which is external equipment; and a function for performing drive control of a notification portion having a cellular telephone function depending upon the latest numeric value data after the update has been acquired.

In the first and second embodiments above, the vibration intensity is varied while performing variable control of the notification pattern. Further, the alarm sound count (number of times), the blinking lamp blink count, etc. may also be varied.

Also, in the first embodiment mentioned above, the notification pattern is performed corresponding to the updated amount of money. Whereas, in the second embodiment mentioned above, the notification pattern is performed corresponding to the card remaining balance and indicated separately. In this regard, it is also possible to perform a notification of the updated amount of money and the card remaining balance simultaneously. For example, a feasible simultaneous notification can be set for performing variable control of the vibration patterns corresponding to the updated amount of money and performing variable control of the lamp blink patterns corresponding to the card remaining balance.

In addition, as mentioned above, the electromotive force induced in the non-contact type IC card processing chip 114 by the reception of electromagnet waves from the antenna section 114C may be used as operating power (energizing power) of the non-contact type IC card. It is also feasible to acquire operating power for the non-contact type IC card from the power of the cellular telephone side.

Furthermore, as mentioned above, although the CPU 114A for IC card exclusive use is provided in the non-contact type IC card processing chip 114 side, it is also possible for the CPU 101 cellular telephone side to control that operation instead of the CPU 114A for IC card exclusive use.

Moreover, a non-contact type IC card is used as a credit card, but it is possible to be used as a prepaid card for train services, buses, shopping, etc. and that configuration of use can also be optional.

While the present invention has been described with reference to the preferred embodiments, it is intended that the invention be not limited by any of the details of the description therein but includes all the embodiments which fall within the scope of the appended claims.

What is claimed is:

1. A cellular telephone device comprising a non-contact type integrated circuit card processing section which performs wireless communication with an external card processing device, comprising:

an acquisition means for acquiring latest numeric value data after an update, whenever numeric value data indicating a monetary value stored in the non-contact type integrated circuit card processing section has been updated by wireless communication with the external card processing device; and a notification control means for performing drive control of a notification portion having a cellular telephone function depending upon whether or not said latest numeric value data after said update acquired by said acquisition means meets any one of a plurality of threshold levels.

2. The cellular telephone device according to claim 1, wherein said notification portion comprises two or more notification sections, each notification section is different in style, and said notification control means acquires an updated value to update said numeric value data in the non-contact type integrated circuit card processing section and, depending upon said updated value, modifies a style of the two or more notification sections from said notification portion having said cellular telephone function.

3. The cellular telephone device according to claim 1, wherein said notification portion comprises two or more notification sections, and said notification control means acquires an updated value to update said numeric value data in the non-contact type integrated circuit card processing section, and depending upon said updated value, modifies the two or more notification sections from said notification portion having said cellular telephone function.

4. The cellular telephone device according to claim 1, wherein said notification portion having said cellular telephone function is at least one of a drive object including a vibration motor, a blinking lamp, and a speaker, and said notification control means performs drive control of said notification portion in a different style than a notification style used as cellular telephone function.

5. The cellular telephone device according to claim 4, wherein said notification control means performs variable control of at least one of a notification time duration and a notification pattern depending upon whether or not said latest numeric value data after said update acquired by said acquisition means meets any one of a plurality of threshold levels.

6. The cellular telephone device according to claim 4, wherein said notification control means in cases where selectively designating any one of a plurality of drive objects of said notification portion having said cellular telephone function, a first drive object is selectively designated when said numeric value data stored in the non-contact type integrated circuit card processing section has been updated and a second drive object is selectively designated when said latest numeric value data after said update decreases below a preset value optionally set in advance.

7. The cellular telephone device according to claim 4, wherein said notification control means compares said latest numeric value after said update with a preset values optionally set in advance to provide a comparison result and controls a notification operation depending upon said comparison result.

8. A computer-readable medium, tangibly embodying a program of instructions executable by a computer to perform the method steps:

acquiring latest numeric value data after an update, whenever numeric value data indicating a monetary value stored in a non-contact type integrated circuit card processing section has been updated by wireless communication with an external card processing device; and performing drive control of a notification portion having a cellular telephone function depending upon whether or not said latest numeric value data after said update meets any one of a plurality of threshold levels.

9. A cellular telephone device comprising a non-contact type integrated circuit card processing section which performs wireless communication with an external card processing device, comprising:
- an incoming call detection means for detecting an incoming telephone call;
- a notification means for performing a notification at the time of the incoming telephone call using vibration or sound;
- a card communication detection means for detecting a communication between the non-contact type integrated circuit card processing section and the external card processing device;
- a comparison means, when detecting the communication with the card processing device, for comparing numeric value data indicating a monetary value based on information acquired by the communication with preset values; and
- a notification control means, when the incoming-call detection means detects the incoming telephone call, for controlling the notification means to perform the notification by the vibration or sound according to whether or not a manner mode is set up for the cellular telephone device and, when the card communication detection means detects the communication with the external card processing device, for controlling the notification means to perform a notification in a different pattern from the notification at the time of the incoming telephone call,
- wherein the different pattern is modified depending on comparison results.

10. The cellular telephone device according to claim 9, wherein the numeric value data indicating the monetary value comprises data on an updated amount of money that indicates an amount of payment acquired by the communication.

11. The cellular telephone device according to claim 9, wherein the numeric value data indicating the monetary value comprises data on an updated balance acquired by the communication.

12. A cellular telephone device comprising a non-contact type integrated circuit card processing section which performs wireless communication with an external card processing device, the cellular telephone device comprising:
- an incoming call detection means for detecting an incoming telephone call;
- a notification means for performing a notification at the time of the incoming telephone call using vibration or sound;
- a card communication detection means for detecting a communication between the non-contact type integrated circuit card processing section and the external card processing device; and
- a notification control means, when the incoming-call detection means detects the incoming telephone call, for controlling the notification means to perform the notification by the vibration or sound according to whether or not a manner mode is set up for the cellular telephone device and, when the card communication detection means detects the communication with the card processing device, for controlling the notification means to perform a notification in a unique pattern regardless of whether the manner mode is set up or not.

13. A computer-readable medium, tangibly embodying a program of instructions executable by a computer to perform the method steps:
- detecting an incoming telephone call;
- performing a notification at the time of the incoming telephone call using vibration or sound;
- detecting a communication between the non-contact type integrated circuit card processing section and the external card processing device;
- comparing, when detecting the communication with the external card processing device, numeric value data indicating a monetary value based on information acquired by the communication with preset values; and
- controlling, when the incoming-call detection means detects the incoming telephone call, the notification means to perform the notification by the vibration or sound according to whether or not a manner mode is set up for the cellular telephone device and, controlling, when the card communication detection means detects the communication with the card processing device, the notification means to perform a notification in a different pattern from the notification at the time of the incoming telephone call,
- wherein the different pattern is modified depending on comparison results.

14. A computer-readable medium, tangibly embodying a program of instructions executable by a computer to perform the method steps:
- detecting an incoming telephone call;
- performing a notification at the time of the incoming telephone call using vibration or sound;
- detecting a communication between the non-contact type integrated circuit card processing section and the card processing device; and
- controlling, when the incoming-call detection means detects the incoming telephone call, the notification means to perform the notification by the vibration or sound according to whether or not a manner mode is set up for the cellular telephone device and, controlling, when the card communication detection means detects the communication with the card processing device, the notification means to perform a notification in a unique pattern regardless of whether the manner mode is set up or not.

* * * * *